United States Patent
Hu et al.

(10) Patent No.: US 8,872,388 B2
(45) Date of Patent: Oct. 28, 2014

(54) DISCHARGE APPARATUS FOR AUXILIARY POWER

(75) Inventors: Zhou Hu, Shanghai (CN); Tong-Xin Wang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 570 days.

(21) Appl. No.: 13/246,842

(22) Filed: Sep. 27, 2011

(65) Prior Publication Data

US 2013/0076139 A1 Mar. 28, 2013

(30) Foreign Application Priority Data

Jul. 19, 2011 (CN) .................... 2011 2 0254431 U

(51) Int. Cl.
*H01H 3/00* (2006.01)
*H02J 1/10* (2006.01)
*H02J 9/06* (2006.01)

(52) U.S. Cl.
CPC .... *H02J 1/10* (2013.01); *H02J 9/06* (2013.01)
USPC ......................................................... 307/139

(58) Field of Classification Search
CPC .......................................................... H01H 9/54
USPC .................................................. 307/139, 140
See application file for complete search history.

(56) References Cited

U.S. PATENT DOCUMENTS 7,638,902 B2 * 12/2009 Hwang ........................ 307/130
2012/0268020 A1 * 10/2012 Newman et al. .............. 315/182
2012/0280617 A1 * 11/2012 Josefowicz et al. ............. 315/85

* cited by examiner

*Primary Examiner* — Daniel Cavallari
(74) *Attorney, Agent, or Firm* — Chun-Ming Shih; HDLS IPR Services

(57) ABSTRACT

A discharge apparatus for auxiliary power is applied to an alternating current power apparatus and a switching power supply. The switching power supply includes an auxiliary power unit. The auxiliary power unit will not discharge to the discharge apparatus for auxiliary power when the alternating current power apparatus supplies power to the discharge apparatus for auxiliary power and the auxiliary power unit. The auxiliary power unit will discharge to the discharge apparatus for auxiliary power when the alternating current power apparatus stops supplying power to the discharge apparatus for auxiliary power and the auxiliary power unit.

12 Claims, 2 Drawing Sheets

DISCHARGE APPARATUS FOR AUXILIARY POWER

BACKGROUND OF THE INVENTION

1. Field of the Invention

The present invention relates to a discharge apparatus and in particular to a discharge apparatus for auxiliary power.

2. Description of Prior Art

FIG. 1 shows a block diagram of switching power supply of prior art. A switching power supply 10 is applied to an alternating current power apparatus 20 and a load 30. The switching power supply 10 includes a primary output power unit 102, an auxiliary power unit 104, and a rectifying and power factor correction unit 106. The primary output power unit 102 is electrically connected to the rectifying and power factor correction unit 106, the auxiliary power unit 104, and the load 30. The auxiliary power unit 104 is electrically connected to the rectifying and power factor correction unit 106. The alternating current power apparatus 20 is electrically connected to the rectifying and power factor correction unit 106.

An alternating current power is sent from the alternating current power apparatus 20 to the rectifying and power factor correction unit 106. A direct current power is sent from the rectifying and power factor correction unit 106 to the primary output power unit 102 and the auxiliary power unit 104. A driving power is sent from the auxiliary power unit 104 to the primary output power unit 102 to drive the primary output power unit 102 after the direct current power is received by the auxiliary power unit 104. A load power is sent from the primary output power unit 102 to the load 30 to supply power to the load 30 after the direct current power is received by the primary output power unit 102.

The auxiliary power unit 104 will not discharge when the alternating current power apparatus 20 supplies power. The auxiliary power unit 104 will discharge when the alternating current power apparatus 20 stops supplying power. The conventional discharge time of the auxiliary power unit 104 is about several minutes, and it is disadvantageously long.

SUMMARY OF THE INVENTION

In order to solve the above-mentioned problems, an object of the present invention is to provide a discharge apparatus for auxiliary power to shorten the discharge time of the auxiliary power unit of the switching power supply.

In order to achieve the object of the present invention mentioned above, the discharge apparatus for auxiliary power of the present invention is applied to an alternating current power apparatus and a switching power supply. The switching power supply includes a primary output power unit and an auxiliary power unit. The discharge apparatus for auxiliary power is electrically connected to the alternating current power apparatus and the auxiliary power unit. The discharge apparatus for auxiliary power comprises a switch, a first discharge resistor, a first voltage division resistor, a first capacitor, a Zener diode, a first unidirectional current passing unit, and a second unidirectional current passing unit. The switch includes a first contact point, a second contact point, and a third contact point, wherein the third contact point is electrically connected to ground. The first side of the first discharge resistor is electrically connected to the auxiliary power unit. The second side of the first discharge resistor is electrically connected to the first contact point of the switch. The first side of the first voltage division resistor is electrically connected to the second contact point of the switch. The second side of the first voltage division resistor is electrically connected to ground. The first side of the first capacitor is electrically connected to the second contact point of the switch. The second side of the first capacitor is electrically connected to ground. The anode of the Zener diode is electrically connected to the second contact point of the switch. The cathode of the Zener diode is electrically connected to ground. The first side of the first unidirectional current passing unit is electrically connected to the second contact point of the switch. The second side of the first unidirectional current passing unit is electrically connected to the alternating current power apparatus. The first side of the second unidirectional current passing unit is electrically connected to the second side of the first unidirectional current passing unit and the alternating current power apparatus. The second side of the second unidirectional current passing unit is electrically connected to ground.

The efficiency of the present invention is to shorten the discharge time of the auxiliary power unit of the switching power supply.

DETAILED DESCRIPTION OF THE INVENTION

Figure 1:
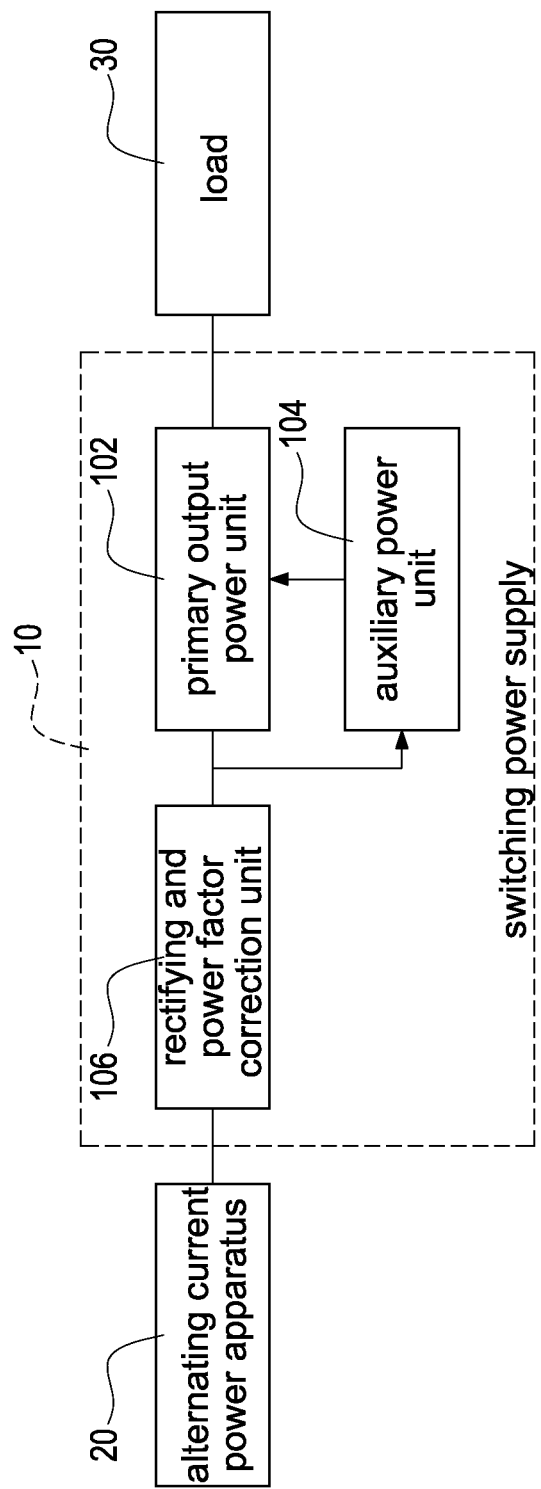
FIG. 1 shows a block diagram of switching power supply of prior art.
Figure 2:
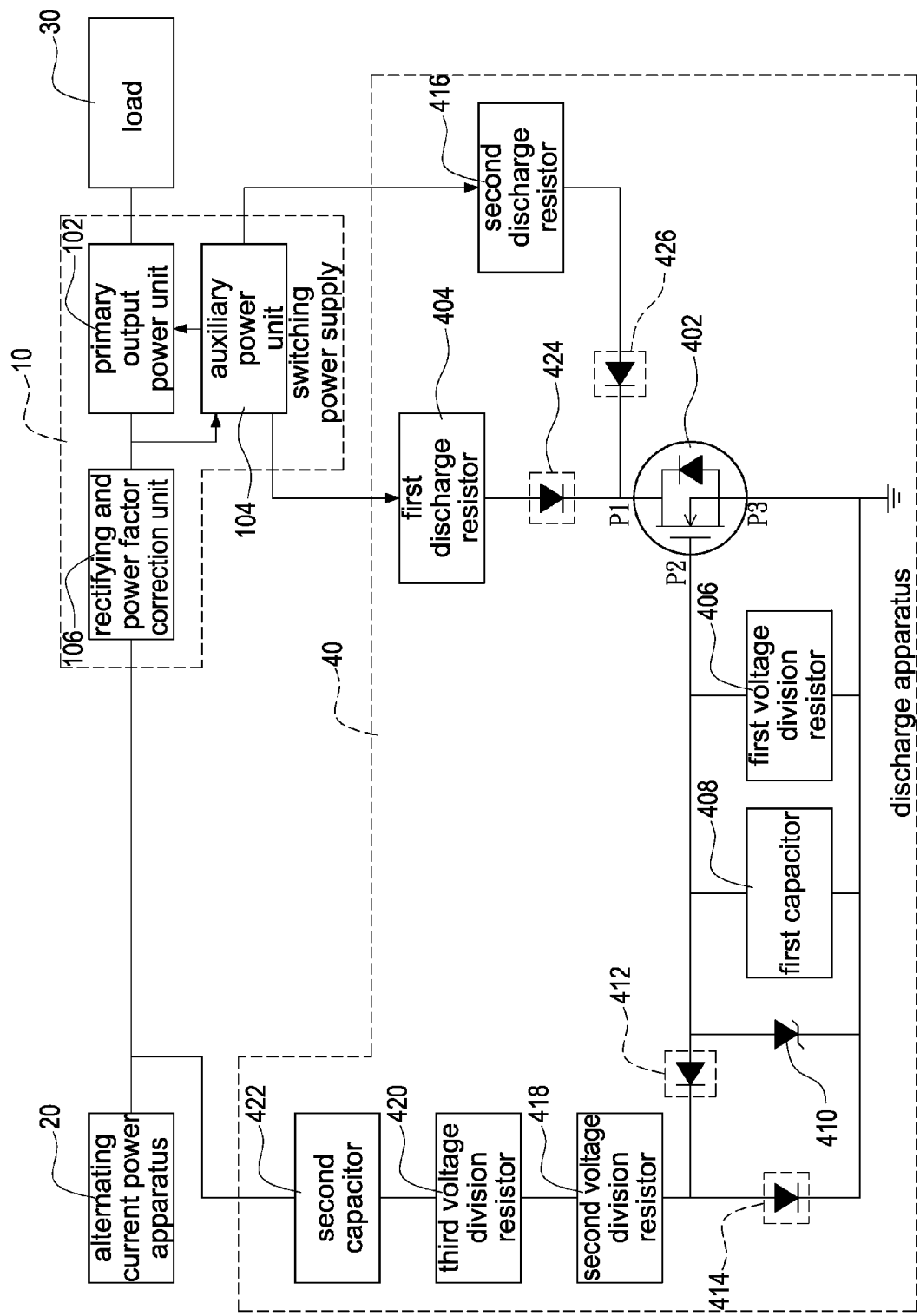
FIG. 2 shows a block diagram of the discharge apparatus for auxiliary power according to the present invention.

FIG. 2 shows a block diagram of the discharge apparatus for auxiliary power according to the present invention. The discharge apparatus 40 for auxiliary power according to the present invention is applied to a switching power supply 10, an alternating current power apparatus 20, and a load 30. The switching power supply 10 includes a primary output power unit 102, an auxiliary power unit 104, and a rectifying and power factor correction unit 106.

The primary output power unit 102 is electrically connected to the rectifying and power factor correction unit 106, the auxiliary power unit 104, and the load 30. The auxiliary power unit 104 is electrically connected to the rectifying and power factor correction unit 106. The alternating current power apparatus 20 is electrically connected to the rectifying and power factor correction unit 106. The discharge apparatus 40 for auxiliary power is electrically connected to the alternating current power apparatus 20 and the auxiliary power unit 104.

The discharge apparatus 40 for auxiliary power includes a switch 402, a first discharge resistor 404, a first voltage division resistor 406, a first capacitor 408, a Zener diode 410, a first unidirectional current passing unit 412, a second unidirectional current passing unit 414, a second discharge resistor 416, a second voltage division resistor 418, a third voltage division resistor 420, a second capacitor 422, a third unidirectional current passing unit 424, and a fourth unidirectional current passing unit 426. The switch 402 includes a first contact point P1, a second contact point P2, and a third contact point P3. The third contact point P3 of the switch 402 is electrically connected to ground. The first side of the first discharge resistor 404 is electrically connected to the auxiliary power unit 104. The second side of the first discharge resistor 404 is electrically connected to the first contact point P1 of the switch 402. The first side of the first voltage division resistor 406 is electrically connected to the second contact point P2 of the switch 402. The second side of the first voltage division resistor 406 is electrically connected to ground.

The first side of the first capacitor 408 is electrically connected to the second contact point P2 of the switch 402. The second side of the first capacitor 408 is electrically connected to ground. The anode of the Zener diode 410 is electrically connected to the second contact point P2 of the switch 402. The cathode of the Zener diode 410 is electrically connected to ground. The first side of the first unidirectional current passing unit 412 is electrically connected to the second contact point P2 of the switch 402. The second side of the first unidirectional current passing unit 412 is electrically connected to the alternating current power apparatus 20. The first side of the second unidirectional current passing unit 414 is electrically connected to the second side of the first unidirectional current passing unit 412 and the alternating current power apparatus 20. The second side of the second unidirectional current passing unit 414 is electrically connected to ground.

The first side of the second discharge resistor 416 is electrically connected to the auxiliary power unit 104. The second side of the second discharge resistor 416 is electrically connected to the first contact point P1 of the switch 402. The first side of the second voltage division resistor 418 is electrically connected to the alternating current power apparatus 20. The second side of the second voltage division resistor 418 is electrically connected to the second side of the first unidirectional current passing unit 412 and the first side of the second unidirectional current passing unit 414.

The first side of the third voltage division resistor 420 is electrically connected to the alternating current power apparatus 20. The second side of the third voltage division resistor 420 is electrically connected to the first side of the second voltage division resistor 418. The first side of the second capacitor 422 is electrically connected to the alternating current power apparatus 20. The second side of the second capacitor 422 is electrically connected to the first side of the third voltage division resistor 420.

The first side of the third unidirectional current passing unit 424 is electrically connected to the second side of the first discharge resistor 404. The second side of the third unidirectional current passing unit 424 is electrically connected to the first contact point P1 of the switch 402. The first side of the fourth unidirectional current passing unit 426 is electrically connected to the second side of the second discharge resistor 416. The second side of the fourth unidirectional current passing unit 426 is electrically connected to the first contact point P1 of the switch 402.

The switch 402 could be a transistor switch. The first unidirectional current passing unit 412 could be a first diode, and the first side of the first unidirectional current passing unit 412 is the anode of the first diode and the second side of the first unidirectional current passing unit 412 is the cathode of the first diode. The second unidirectional current passing unit 414 could be a second diode, and the first side of the second unidirectional current passing unit 414 is the anode of the second diode and the second side of the second unidirectional current passing unit 414 is the cathode of the second diode.

The third unidirectional current passing unit 424 could be a third diode, and the first side of the third unidirectional current passing unit 424 is the anode of the third diode and the second side of the third unidirectional current passing unit 424 is the cathode of the third diode. The fourth unidirectional current passing unit 426 could be a fourth diode, and the first side of the fourth unidirectional current passing unit 426 is the anode of the fourth diode and the second side of the fourth unidirectional current passing unit 426 is the cathode of the fourth diode.

An alternating current power is sent from the alternating current power apparatus 20 to the rectifying and power factor correction unit 106 and the discharge apparatus 40 for auxiliary power. A direct current power is sent from the rectifying and power factor correction apparatus 106 to the primary output power unit 102 and the auxiliary power unit 104.

A driving power is sent from the auxiliary power unit 104 to the primary output power unit 102 to drive the primary output power unit 102 after the direct current power is received by the auxiliary power unit 104. A load power is sent from the primary output power unit 102 to the load 30 to supply power to the load 30 after the direct current power is received by the primary output power unit 102.

When the alternating current power is sent from the alternating current power apparatus 20 to the discharge apparatus 40 for auxiliary power, the switch 402 will not be conducted so that the auxiliary power unit 104 will not discharge to the first discharge resistor 404 and the second discharge resistor 416 (because the auxiliary power unit 104 receives power, the auxiliary power unit 104 will not discharge).

When the alternating current power apparatus 20 stops sending the alternating current power to the rectifying and power factor correction unit 106 and the rectifying and power factor correction unit 106 stops sending the direct current power to the auxiliary power unit 104 (i.e. the auxiliary power unit 104 doesn't receive power), the auxiliary power unit 104 will discharge. In the meantime, the switch 402 will be conducted when the alternating current power apparatus 20 stops sending the alternating current power to the discharge apparatus 40 for auxiliary power. Therefore, the auxiliary power unit 104 will discharge to the first discharge resistor 404 and the second discharge resistor 416.

The alternating current power will be electrically connected to ground through the second capacitor 422, the third voltage division resistor 420, the second voltage division resistor 418, and the second unidirectional current passing unit 414 when the alternating current power is in the positive half cycle. Therefore, the second contact point P2 of the switch 402 doesn't have the driving voltage for the switch 402, so that the switch 402 will not be conducted.

The alternating current power will be electrically connected to ground through the second capacitor 422, the third voltage division resistor 420, the second voltage division resistor 418, the first unidirectional current passing unit 412, and the first capacitor 408 when the alternating current power is in the negative half cycle. Therefore, the second contact point P2 of the switch 402 doesn't have the driving voltage for the switch 402, so that the switch 402 will not be conducted.

Therefore, the switch 402 will not be conducted when the alternating current power is sent from the alternating current power apparatus 20 to the discharge apparatus 40 for auxiliary power, but the first capacitor 408 will be charged by the alternating current power.

When the alternating current power apparatus 20 stops sending the alternating current power to the discharge apparatus 40 for auxiliary power, the first capacitor 408 will discharge, so that the second contact point P2 of the switch 402 will have the driving voltage for the switch 402. Moreover, the first contact point P1 of the switch 402 also has the voltage from the auxiliary power unit 104, so that the switch 402 will be conducted.

The second capacitor 422 is used to couple the alternating current power. The third voltage division resistor 420, the second voltage division resistor 418, the first voltage division resistor 406, and the Zener diode 410 are used for voltage division and are used to impact the voltage of the second contact point P2 of the switch 402 when the alternating current power is sent from the alternating current power apparatus 20 to the discharge apparatus 40 for auxiliary power.

The first unidirectional current passing unit 412 and the second unidirectional current passing unit 414 are used to decide the charge-discharge current loop for the first capacitor 408. The time constant which is decided by the first capacitor 408 and the first voltage division resistor 406 controls the conduction time of the switch 402 to impact the discharge time of the auxiliary power unit 104. The electrical characteristics of the switch 402 will also impact the discharge time of the auxiliary power unit 104.

In a specific embodiment, the first discharge resistor 404 is electrically connected to the capacitor which is in the power pin of the control integrated circuit of the auxiliary power unit 104, so that the auxiliary power unit 104 will be able to discharge when the alternating current power apparatus 20 stops sending the alternating current power. The second discharge resistor 416 is electrically connected to the base of the transistor which is in the front-end linear stabilizer circuit, so that the auxiliary power unit 104 will be able to discharge when the alternating current power apparatus 20 stops sending the alternating current power.

The major features of the present invention are as follows:

The switch 402 will not be conducted when the alternating current power is sent from the alternating current power apparatus 20 to the discharge apparatus 40 for auxiliary power, so that the auxiliary power unit 104 will not discharge to the first discharge resistor 404 and the second discharge resistor 416.

The auxiliary power unit 104 will discharge when the alternating current power apparatus 20 stops sending the alternating current power to the rectifying and power factor correction unit 106 and the rectifying and power factor correction unit 106 stops sending the direct current power to the auxiliary power unit 104. In the meantime, the switch 402 will be conducted when the alternating current power apparatus 20 stops sending the alternating current power to the discharge apparatus 40 for auxiliary power. Therefore, the auxiliary power unit 104 will discharge to the first discharge resistor 404 and the second discharge resistor 416.

The discharge apparatus 40 for auxiliary power of the present invention could shorten the discharge time of the auxiliary power unit 104 when the alternating current power apparatus 20 stops sending the alternating current power to the switching power supply 10.

Although the present invention has been described with reference to the preferred embodiment thereof, it will be understood that the invention is not limited to the details thereof Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A discharge apparatus applied to an alternating current power apparatus and a switching power supply, the switching power supply including a primary output power unit, a rectifying and power factor correction unit and an auxiliary power unit, wherein the primary output power unit is electrically connected to the rectifying and power factor correction unit and the auxiliary power unit, the auxiliary power unit is electrically connected to the rectifying and power factor correction unit, and the alternating current power apparatus is electrically connected to the rectifying and power factor correction unit, the discharge apparatus being electrically connected to the alternating current power apparatus and the auxiliary power unit, the discharge apparatus comprising:

a switch including a first contact point, a second contact point, and a third contact point, the third contact point being electrically connected to ground;

a first discharge resistor, the first side of the first discharge resistor being electrically connected to the auxiliary power unit, the second side of the first discharge resistor being electrically connected to the first contact point of the switch;

a first voltage division resistor, the first side of the first voltage division resistor being electrically connected to the second contact point of the switch, the second side of the first voltage division resistor being electrically connected to ground;

a first capacitor, the first side of the first capacitor being electrically connected to the second contact point of the switch, the second side of the first capacitor being electrically connected to ground;

a Zener diode, the anode of the Zener diode being electrically connected to the second contact point of the switch, the cathode of the Zener diode being electrically connected to ground;

a first unidirectional current passing unit, the first side of the first unidirectional current passing unit being electrically connected to the second contact point of the switch, the second side of the first unidirectional current passing unit being electrically connected to the alternating current power apparatus; and a second unidirectional current passing unit, the first side of the second unidirectional current passing unit being electrically connected to the second side of the first unidirectional current passing unit and the alternating current power apparatus, the second side of the second unidirectional current passing unit being electrically connected to ground, wherein when the alternating current power apparatus stops sending an alternating current power to the rectifying and power factor correction unit and the rectifying and power factor correction unit stops sending a direct current power to the auxiliary power unit, the auxiliary power unit discharges; the switch is conducted when the alternating current power apparatus stops sending the alternating current power to the discharge apparatus; therefore, the auxiliary power unit discharge to the first discharge resistor.

2. The discharge apparatus in claim 1, further including a second discharge resistor, the first side of the second discharge resistor being electrically connected to the auxiliary power unit, the second side of the second discharge resistor being electrically connected to the first contact point of the switch.

3. The discharge apparatus in claim 2, further including a second voltage division resistor, the first side of the second voltage division resistor being electrically connected to the alternating current power apparatus, the second side of the second voltage division resistor being electrically connected to the second side of the first unidirectional current passing unit and the first side of the second unidirectional current passing unit.

4. The discharge apparatus in claim 3, further including a third voltage division resistor, the first side of the third voltage division resistor being electrically connected to the alternating current power apparatus, the second side of the third voltage division resistor being electrically connected to the first side of the second voltage division resistor.

5. The discharge apparatus in claim 4, further including a second capacitor, the first side of the second capacitor being electrically connected to the alternating current power apparatus, the second side of the second capacitor being electrically connected to the first side of the third voltage division resistor.

6. The discharge apparatus in claim 5, further including a third unidirectional current passing unit, the first side of the third unidirectional current passing unit being electrically connected to the second side of the first discharge resistor, the second side of the third unidirectional current passing unit being electrically connected to the first contact point of the switch.

7. The discharge apparatus in claim 6, further including a fourth unidirectional current passing unit, the first side of the fourth unidirectional current passing unit being electrically connected to the second side of the second discharge resistor, the second side of the fourth unidirectional current passing unit being electrically connected to the first contact point of the switch.

8. The discharge apparatus in claim 7, wherein the switch is a transistor switch.

9. The discharge apparatus in claim 8, wherein the first unidirectional current passing unit is a first diode, and the first side of the first diode is the anode and the second side of the first diode is the cathode.

10. The discharge apparatus in claim 9, wherein the second unidirectional current passing unit is a second diode, and the first side of the second diode is the anode and the second side of the second diode is the cathode.

11. The discharge apparatus in claim 10, wherein the third unidirectional current passing unit is a third diode, and the first side of the third diode is the anode and the second side of the third diode is the cathode.

12. The discharge apparatus in claim 11, wherein the fourth unidirectional current passing unit is a fourth diode, and the first side of the fourth diode is the anode and the second side of the fourth diode is the cathode.

* * * * *